United States Patent
Nagghappan et al.

(10) Patent No.: US 7,438,817 B2
(45) Date of Patent: Oct. 21, 2008

(54) SYSTEM AND METHOD FOR TREATMENT OF ACIDIC WASTEWATER

(75) Inventors: Lnsp Nagghappan, Pittsburgh, PA (US); Robert P. Helwick, Mckees Rocks, PA (US)

(73) Assignee: OTU SA (FR)

( * ) Notice: Subject to any disclaimer, the term of this patent is extended or adjusted under 35 U.S.C. 154(b) by 495 days.

(21) Appl. No.: 10/899,326

(22) Filed: Jul. 26, 2004

(65) Prior Publication Data
US 2005/0051488 A1   Mar. 10, 2005

Related U.S. Application Data

(60) Provisional application No. 60/489,853, filed on Jul. 24, 2003.

(51) Int. Cl.
B01D 61/04 (2006.01)

(52) U.S. Cl. ........................ 210/639; 210/202; 210/259; 210/266; 210/652; 210/702; 210/754; 210/764; 210/806

(58) Field of Classification Search ................ 210/639, 210/650, 651, 652, 702, 738, 764, 805, 806, 210/200–202, 259, 266, 321.6, 754
See application file for complete search history.

(56) References Cited

U.S. PATENT DOCUMENTS

| | | | | |
|---|---|---|---|---|
| 3,249,498 A * | 5/1966 | Matzner | ...................... | 514/190 |
| 3,252,855 A * | 5/1966 | Wehner | ...................... | 504/160 |
| 4,574,049 A * | 3/1986 | Pittner | ........................ | 210/639 |
| 5,707,514 A * | 1/1998 | Yamasaki et al. | ........... | 210/151 |
| 5,766,479 A | 6/1998 | Collentro et al. | | |
| 6,071,413 A | 6/2000 | Dyke | | |
| 6,113,797 A | 9/2000 | Al-Samadi | | |
| 6,267,891 B1 * | 7/2001 | Tonelli et al. | ............... | 210/652 |
| 6,277,285 B1 * | 8/2001 | Vion | .......................... | 210/709 |
| 6,338,803 B1 | 1/2002 | Campbell et al. | | |
| 6,398,965 B1 | 6/2002 | Arba et al. | | |
| 6,537,456 B2 * | 3/2003 | Mukhopadhyay | ........... | 210/652 |
| 6,649,037 B2 * | 11/2003 | Liang et al. | ................. | 204/632 |
| 2003/0080067 A1 | 5/2003 | Michalski et al. | | |

FOREIGN PATENT DOCUMENTS

WO    WO 02/068338 A2    9/2002

(Continued)

OTHER PUBLICATIONS

Desjardins et al., "Laboratory Study of Ballasted Flocculation," Water Research, Feb. 2002, pp. 744-754, vol. 36, No. 3, Pergamon Press, Oxford, Great Britain.

(Continued)

Primary Examiner—Joseph W Drodge
(74) Attorney, Agent, or Firm—Coats & Bennett, P.L.L.C.

(57) ABSTRACT

A wastewater treatment system comprising separation unit operations inhibits or promotes the formation and precipitation of species by controlling the pH of wastewater to be treated entering into the separation unit operations. The separation unit operations include first and second reverse osmosis devices. The first reverse osmosis device treats wastewater having pH that is less than about 3.5 and the second reverse osmosis device treats wastewater, from the first reverse osmosis device, having a pH that is about 6 or higher.

34 Claims, 6 Drawing Sheets

FOREIGN PATENT DOCUMENTS

WO     WO 03/008336 A2     1/2003

OTHER PUBLICATIONS

"Water Reuse Program Update," King County Wastewater Treatment Division, Seattle, Washington, accessed at http://dnr.metrokc.gov/wtd/reuse/reuse-0110.pdf.

Norton, "King County Water Reuse Demonstration Project Sets the Stage for Wide-Scale, Satellite Reuse," Waterscapes, Summer 2003, pp. 3-4, vol. 14, No. 2, The Water Group of HDR, accessed at http://www.hdrinc.com/assets/documents/publications/waterscapes/summer2003/waterscapes_summer2003.pdf.

"Water Reuse Program Update", King County Wastewater Treatment Division, 4 total pages.

Norton, Michael; "King County Water Reuse Demonstration Project Sets the Stage for Wide-Scale, Satellite Reuse"; Waterscapes, vol. 14, No. 2, Summer 2003, 2 total pages.

Desjardins, Christian; Koudjonou, Boniface; Desjardins, Raymond; "Laboratory Study of Ballasted Flocculation", Water Research 36 (2002) pp. 744-754.

\* cited by examiner

SYSTEM AND METHOD FOR TREATMENT OF ACIDIC WASTEWATER

CROSS REFERENCE TO RELATED APPLICATION

This application claims priority under 35 U.S.C. § 119(e) from the following U.S. provisional application: Application Ser. No. 60/489,853 filed on Jul. 24, 2003. That application is incorporated in its entirety by reference herein.

BACKGROUND OF THE INVENTION

1. Field of the Invention

The present invention relates generally to treatment of acidic industrial wastewater and, more particularly, to minimizing precipitation in reverse osmosis systems utilized to treat wastewater.

2. Discussion of the Related Art

Wastewater associated with phosphate manufacturing operations is typically acidic and typically has fluoride, ammonia, silica, sulfate, calcium, heavy metal and phosphate species. Various techniques have been utilized to reduce the level of such contaminants before wastewater can be discharged. For example, the double liming process, followed by air stripping, is a technique that is typically used. It utilizes lime addition in two stages, to promote precipitation of fluoride species and phosphate species, followed by high pH, air stripping to remove ammonia. In another technique, wastewater has been treated by techniques involving chemical precipitation followed by reverse osmosis. Like the double liming process, such techniques raise the pH of influent wastewater to promote precipitation and solids separation before the reverse osmosis step. The high chemical costs typically associated with raising the pH of the wastewater make such processes economically unattractive.

BRIEF SUMMARY OF THE INVENTION

In accordance with one or more embodiments, the present invention provides a wastewater treatment system comprising an influent source comprising wastewater to be treated having a pH less than about 3.5, a first reverse osmosis system fluidly connected to the influent source, an alkali source disposed to introduce alkali downstream of the first reverse osmosis system, and a second reverse osmosis system fluidly connected downstream of the first reverse osmosis system and the alkali source.

In accordance with one or more embodiments, the present invention provides a method of treating wastewater having a pH less than about 3.5. The method comprises steps of removing at least a portion of any contaminant from the wastewater in a first separation system, adjusting the pH of an effluent from the first separation system to at least about 6 or higher after removing at least a portion of any contaminant from the wastewater in the first separation system, and removing at least a portion of any contaminant from the wastewater in a second system after adjusting the pH of the effluent from the first separation system to at least about 6 or higher.

In accordance with one or more embodiments, the present invention provides a method of treating wastewater. The method comprises steps of inhibiting conditions in the wastewater that promote the formation of at least one of fluoride ions and silicate ions, removing any contaminant from the wastewater in a first separation system, promoting formation of at least one of the fluoride ions and silicate ions, and removing any contaminant from the wastewater to produce a treated effluent after promoting formation of at least one of the fluoride and silicate ions.

In accordance with one or more embodiments, the present invention provides a method of treating wastewater. The method comprises steps of maintaining an equilibrium condition for any precipitating contaminant in the wastewater, removing any one of phosphates, dissolved solids, ammonia, organic, and colloidal material from the wastewater, adjusting the equilibrium condition of at least one precipitating contaminant in the wastewater after removing any one of dissolved solids, ammonia, organic, and colloidal material from the wastewater, and removing any residual fluoride, ammonia, or dissolved solid material from the wastewater to produce a treated effluent after adjusting the equilibrium condition of at least one precipitating contaminant in the wastewater.

The present invention provides a method of removing fluorides and silica from wastewater using a reverse osmosis system where the method reduces the potential for scaling in the reverse osmosis system. In the case of this aspect of the invention, the method entails promoting conditions in the wastewater that favor the formation of hydrofluorosilicic acid and directing the wastewater having the hydrofluorosilicic acid to the reverse osmosis system. As the wastewater passes through the reverse osmosis system, fluorides and silica in the form of the hydrofluorosilicic acid is removed from the wastewater. A second stage reverse osmosis system can be utilized to remove additional fluorides and silica. In this case, conditions are maintained in the wastewater effluent from the first reverse osmosis system that favors the formation of fluoride and silicate ions. Thus, additional fluorides and silica in the form of fluoride and silicate ions are removed as the wastewater passes through the second reverse osmosis system.

Further, the present invention entails removing algae from wastewater. In one particular embodiment, the wastewater is acidic. To remove algae from the wastewater, chlorine or a byproduct of chlorine is added to the wastewater to kill the algae. Further, bentonite is added and the algae, after being subjected to treatment with the chlorine or chlorine byproduct, is absorbed and or destabilized by the bentonite. Thereafter the algae can be removed by conventional process means.

In one particular embodiment of the present invention, the algae and/or suspended matter is removed through a ballasted flocculation separation system. In this process, the absorbed algae and bentonite form solids in the wastewater. In the ballasted flocculation process, a flocculant and insoluble granular material are added to the wastewater to form a flocculated mixture. The flocculated mixture form flocs, including the absorbed algae and bentonite, that settle from the wastewater.

Other advantages, novel features, and objects of the invention will become apparent from the following detailed description of the invention when considered in conjunction with the accompanying drawings, some of which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Non-limiting embodiments of the present invention will be described by way of example with reference to the accompanying drawings in which.

DETAILED DESCRIPTION OF THE INVENTION

Figure 1:
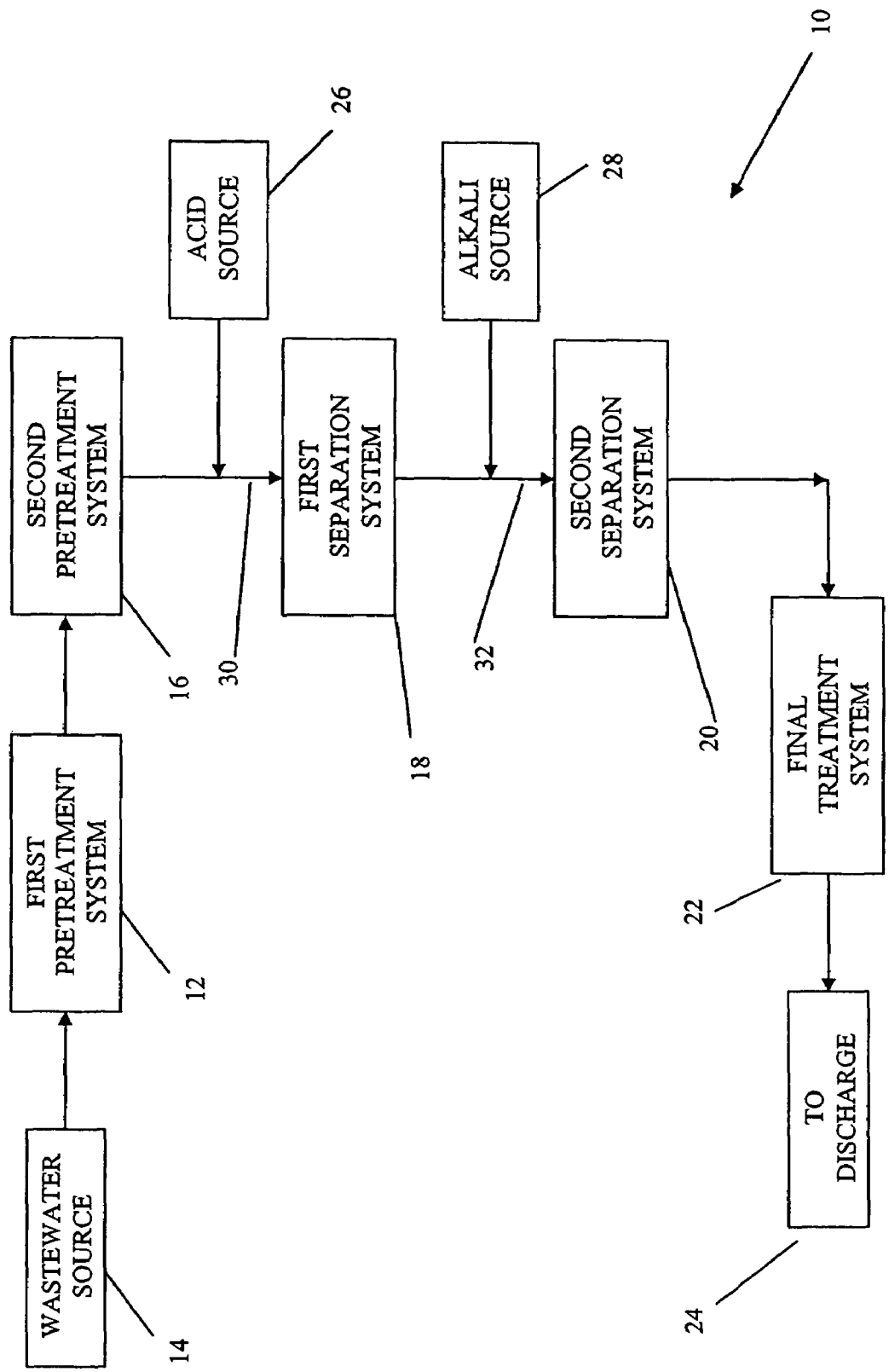
FIG. 1 is a process flow diagram in accordance with one or more embodiments of the present invention showing a wastewater treatment system.

Treatment of wastewater containing silica, calcium sulfate, calcium phosphate, calcium fluoride as well as any other species that can precipitate under neutral, or near neutral, pH conditions present scaling concerns. For example, reverse osmosis unit operations or systems develop scale when such wastewater is passed therethrough. Other potential fouling problems include those associated with soluble organic compounds as well as from organic materials. Consequently, such systems face significant operating costs such as, but not limited to, membrane cleaning and/or replacement and high chemical consumption. Accordingly, the present invention provides a system and a process for treating wastewater that utilize chemical equilibrium properties in stages to produce an effluent suitable for discharge in regulated waterways. For example, the system and methods in accordance with the present invention can produce effluent, treated wastewater, having low concentrations of dissolved solids, fluoride, ammonia, phosphate, and sulfate species that can meet water discharge requirements. Thus, in accordance with one or more embodiments, the present invention provides a wastewater treatment system comprising an influent source comprising wastewater to be treated having a pH less than about 3.5, a first reverse osmosis system fluidly connected to the influent source, an alkali source disposed to introduce alkali downstream of the first reverse osmosis system, and a second reverse osmosis system fluidly connected downstream of the first reverse osmosis system and the alkali source. The wastewater treatment system can further comprise a clarifier fluidly connected between the influent source and the first reverse osmosis system. The wastewater treatment system can further comprise a multimedia or other type of filter fluidly connected between the influent source and the first reverse osmosis system. The wastewater treatment system can also further comprise an acid source disposed to add acid to the wastewater upstream of the first reverse osmosis system. The wastewater treatment system can also further comprise a mixed-bed polisher fluidly connected downstream of the second reverse 25osmosis system. In accordance with further embodiments, the present invention provides a method of treating wastewater having a pH less than about 3.5. The method can comprise steps of removing at least a portion of any undesirable species from the wastewater in a first separation system, adjusting the pH of an effluent from the first separation system to at least about 6 after removing at least a portion of any undesirable species from the wastewater in the first separation system, and removing at least a portion of any undesirable species from the wastewater in a second system after adjusting the pH of the effluent from the first separation system to at least about 6. The method can further comprise a step of clarifying the wastewater prior to performing the step of removing at least a portion of any undesirable species in the first separation unit operation. The method can further comprise a step of removing any organic matter from the wastewater prior to performing the step of removing at least a portion of any undesirable species in the first separation system. The step of removing any organic matter can comprise adding a disinfectant, a coagulant and a flocculating agent to the wastewater. The method can further comprise a step of removing any fine solids from the wastewater prior to performing the step of removing at least a portion of any undesirable species in the first separation system. The method can further comprise a step of adjusting a pH of the wastewater to about 3 prior to performing the step of removing at least a portion of undesirable species in the first separation system. The method can further comprise a step of reducing any one of ammonia and phosphate in treated wastewater from the second separation system to levels that comply with established EPA requirements.

In accordance with still further embodiments, the present invention provides a method of treating wastewater. The method can comprise steps of inhibiting conditions in the wastewater that promote the formation of at least one of fluoride ions and silicate ions, promoting conditions in the wastewater that form or maintain a complexing species of silica and fluoride, removing at least one undesirable species from the wastewater while promoting condition that form or maintain a complexing species of silica and fluoride, adjusting the wastewater conditions to inhibit the formation of the complexing species after removing at least one undesirable species from the wastewater. The method can further comprise a step of removing at least a portion of any organic matter from the wastewater prior to removing any undesirable species from the wastewater in a first separation system.

In accordance with other embodiments, the present invention provides a method of treating wastewater. The method can comprise steps of maintaining an equilibrium condition for any precipitating species in the wastewater, removing any one of dissolved solids, ammonia, organic, and colloidal material from the wastewater, adjusting the equilibrium condition of at least one precipitating species in the wastewater after removing any one of dissolved solids, ammonia, organic, and colloidal material from the wastewater, and removing any residual fluoride, ammonia, or dissolved solid material from the wastewater to produce a treated effluent after adjusting the equilibrium condition of at least one precipitating species in the wastewater. The step of removing any one of dissolved solids, ammonia, organic, and colloidal material from the wastewater can be performed while maintaining an equilibrium condition for any precipitating species in the wastewater. In accordance with yet other embodiments, the present invention provides a method of treating wastewater. The method can comprise steps of promoting conditions in the wastewater to form or maintain a complexing species of silica and fluoride, removing at least one undesirable species from the wastewater while promoting conditions to form or maintain a complexing species of silica and fluoride, adjusting the conditions to inhibit the formation of the complexing species of silica and fluoride after removing at least one undesirable species from the wastewater, and removing any residual undesirable species from the wastewater to produce a treated effluent after adjusting the conditions to inhibit the formation of the complexing species. In accordance with one or more embodiments of the present invention, FIG. 1 shows a wastewater treatment system 10, which can comprise a first pretreatment system 12 fluidly, connected to a wastewater, influent, in wastewater source 14. Wastewater treatment system 10 can further comprise a second pretreatment system 16 fluidly connected to first pretreatment system 12. A first separation system 18 and a second separation system 20 is typically fluidly connected downstream of first and/or second pretreatment systems 12 and 16. Treated wastewater, effluent, typically undergoes further treatment in final treatment system 22 prior to transfer to discharge 24.

Influent can be any source of wastewater suitable for treatment in accordance with the present invention. For example, a suitable influent wastewater can be wastewater accumulated having a relatively acidic pH such as those from phosphate manufacturing operations.

Figure 2:
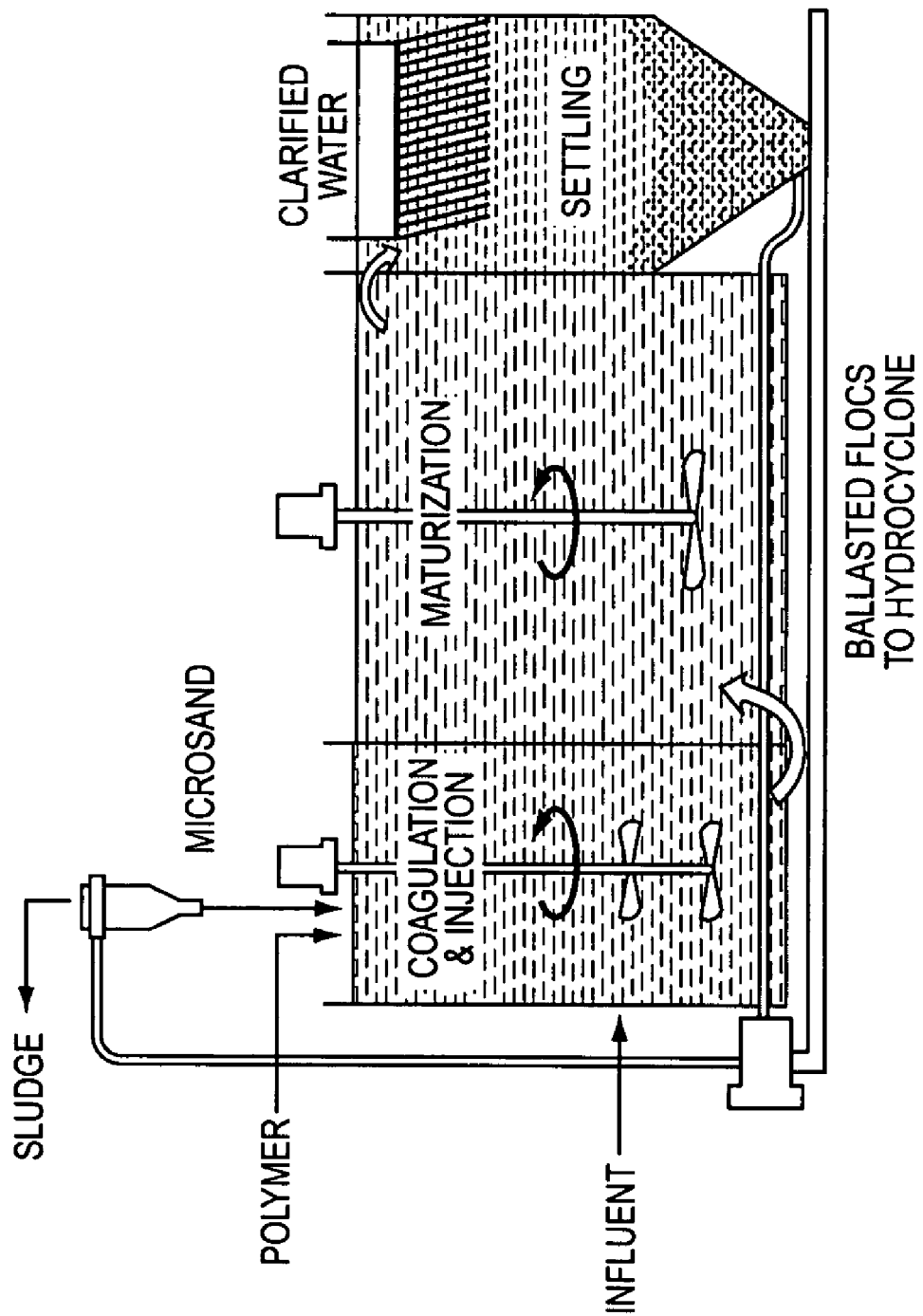
FIG. 2 is a schematic diagram of a ballasted separation system in accordance with one or more embodiments of the present invention.

The first pretreatment system can comprise one or more unit operations that remove organic matter, such as algae as well as reduce the turbidity of the influent wastewater stream at its pH. A suitable pretreatment system can comprise a clarifier having ballasted flocculation subsystems. FIG. 2 shows one such exemplary unit having a coagulation stage, a maturation stage, a settling stage and a hydrocyclone. The clarifier 30 can utilize a disinfectant, such as sodium hypochlorite, to deactivate any microorganisms or organic matter in the wastewater stream; a coagulating agent, such as, but not limited to, bentonite, aluminum sulfate, and ferric chloride, to promote coagulation of deactivated matter; and a flocculating agent such as, but not limited to, nonionic, cationic, anionic polymers or combinations thereof, to promote flocculation of the deactivated, coagulated matter. The clarifier can utilize microsand enhanced settling and hydrocyclone techniques to separate sludge or solids from the liquid-rich stream. Such systems preferably reduce the turbidity of the wastewater stream to less than about 3NTU.

The second pretreatment system comprises one or more unit operations that remove fine solids and/or improve the turbidity of the wastewater stream. A suitable system can comprise a multimedia filter utilizing any of anthracite, sand, and garnet. Such systems preferably reduce the turbidity of wastewater to less than about 2NTU and reduce the SDI to less than about 4 to reduce the likelihood of downstream fouling.

The first and second separation systems remove contaminants or undesirable species from the wastewater to render it suitable for discharge into a body of water. As used herein the phrase suitable for discharge refers to treated wastewater having contaminant concentrations that meet or exceed United States EPA discharge requirements. For example, the first and second separation systems can comprise one or more reverse osmosis devices suitable for service in conditions of the wastewater. Effluent treated wastewater typically has contaminant concentrations as listed in Table 1.

TABLE 1

| Effluent Quality Requirements (in mg/l). | |
| --- | --- |
| Constituent | Concentration |
| pH | 6.5-8.5 |
| Fluoride | <5.0 |
| Ammonia | <1.0 |

TABLE 1-continued

| Effluent Quality Requirements (in mg/l). | |
| --- | --- |
| Constituent | Concentration |
| Total Nitrogen | <2.0 |
| Phosphorus | <0.5 |
| TDS | <50 |

Thus, in accordance with one or more embodiments of the present invention, first separation system 18 can comprise one or more reverse osmosis apparatus having separation membranes (not shown) suitable for service treatment of wastewater, such as brackish water, having a pH of less than about 3, and flux rates of about 6 to about 12 GFD because, it is believed, high flux rate greater than about 12 GFD can lead to fouling and flux rates less than about 6 GFD can lead to low permeate quality. Similarly, second separation system 20 can comprise one or more reverse osmosis apparatus 20 having separation membranes (not shown) suitable for service treatment of wastewater, such as brackish water, having a pH of about 6 to about 7 and flux rates of about 15 to about 20 GFD. As with the reverse osmosis system of the first separation system, higher flux rates can lead to unacceptable fouling whereas lower flux rates can lead to poor permeate quality. Any reverse osmosis apparatus may be utilized in the first or second separation system. Suitable examples include those commercially available from United States Filter Corporation, Milton, Ontario, Canada. Membranes suitable for service in the reverse osmosis apparatus in accordance with the present invention include FILMTEC BW30-365membrane available from FilmTec, a subsidiary of The Dow™ Chemical Corporation, Midland, Mich. The first separation system can be operated to treat wastewater having a pH of less than about 3.5 to promote the formation and/or removal of bisulfate species to inhibit the formation of sulfate species and reduce the scaling potential of calcium sulfate. The first separation system can also be operated to treat wastewater having a pH of less than about 3.5 to promote the formation and/or removal of hydrofluorosilicic species to reduce the scaling potential of silica and calcium fluoride or both. The first separation system can also be operated to treat wastewater having a pH of less than about 3.5 to promote the formation and/or removal of phosphoric acid species to reduce the scaling potential of calcium phosphate. The first separation system can also be operated to treat wastewater having a pH of less than about 3.5 to reduce the scaling potential of metals. The first separation system can also be operated to treat wastewater having a pH of less than about 3.5 to promote the formation and/or removal of ammonium species to improve the ammonia rejection rate. The second separation system can be operated to treat wastewater having a pH of about 6 to about 7 to promote the formation and/or removal of fluoride species to improve the removal of such species. The second separation system can be operated to treat wastewater having a pH of about 6 to about 7 to promote the formation and/or removal of silicate species to improve the removal of such species. The second separation system can be operated to treat wastewater having a pH of about 6 to about 7 to promote the formation and/or removal of phosphate species to improve the removal of such species. The second separation system can be operated to treat wastewater having a pH of about 6 to about 7 to promote the formation and/or removal of organic species to improve the removal of such species. Other techniques may be utilized in the first and second separation system to remove contaminants or otherwise undesirable species including, but not limited to, electrodialysis, electrodeionization, microfiltration, and evaporation/condensation. In some cases, the wastewater treatment system can further comprise an antiscalant and/or a flocculating agent source disposed to introduce an antiscalant and/or a flocculating agent into the wastewater upstream of the pretreatment system or either of the separation systems. Any suitable antiscalant can be used that inhibits the formation of scale in the various unit operations in accordance with the present invention. The antiscalant can be used as recommended by respective manufacturers but are typically introduce at a concentration of about 3 to about 4 ppm. Final treatment system 22 can comprise one or more unit operations that further reduce any contaminant or undesirable species from the treated wastewater and make it suitable for discharge. For example, final treatment system 22 can comprise one or more mixed-bed polishers that reduce ammonia concentration to less than about 1 mgl. The 15 mixed-bed typically can comprise one or more anionic and cationic ion exchange resins that attract and bind residual charged species in the treated wastewater. The ion exchange resin can be present in the mixed-bed in any suitable arrangement to further purify the treated wastewater. Examples of suitable ion exchange resins include the DOWEX™ MARATHON™ resin family, available from The Dow™ Chemical Corporation, Midland, Mich., as well as the AMBERLITE™ resin family available from Rohm and Haas Company, Philadelphia, Pa. Wastewater treatment system 10 typically further includes an acid source 26 and an alkali source 28. Acid source 26 is typically connected to an inlet stream of first separation system 18 and alkali source 28 is typically connected to an inlet stream of second separation system 20. In such an arrangement, acid from acid source 26 can adjust one or more chemical properties of wastewater to be treated in first separation system 18. For example, the pH of wastewater to be treated in an inlet 30 of first separation system 18 can be adjusted to control and/or maintain the solubility or equilibrium of one or more chemical species including, for example, inhibiting formation of precipitating species by, for example, increasing the solubility of such species and/or promoting the formation of a complexing species comprising such otherwise precipitating species.

Figure 3:
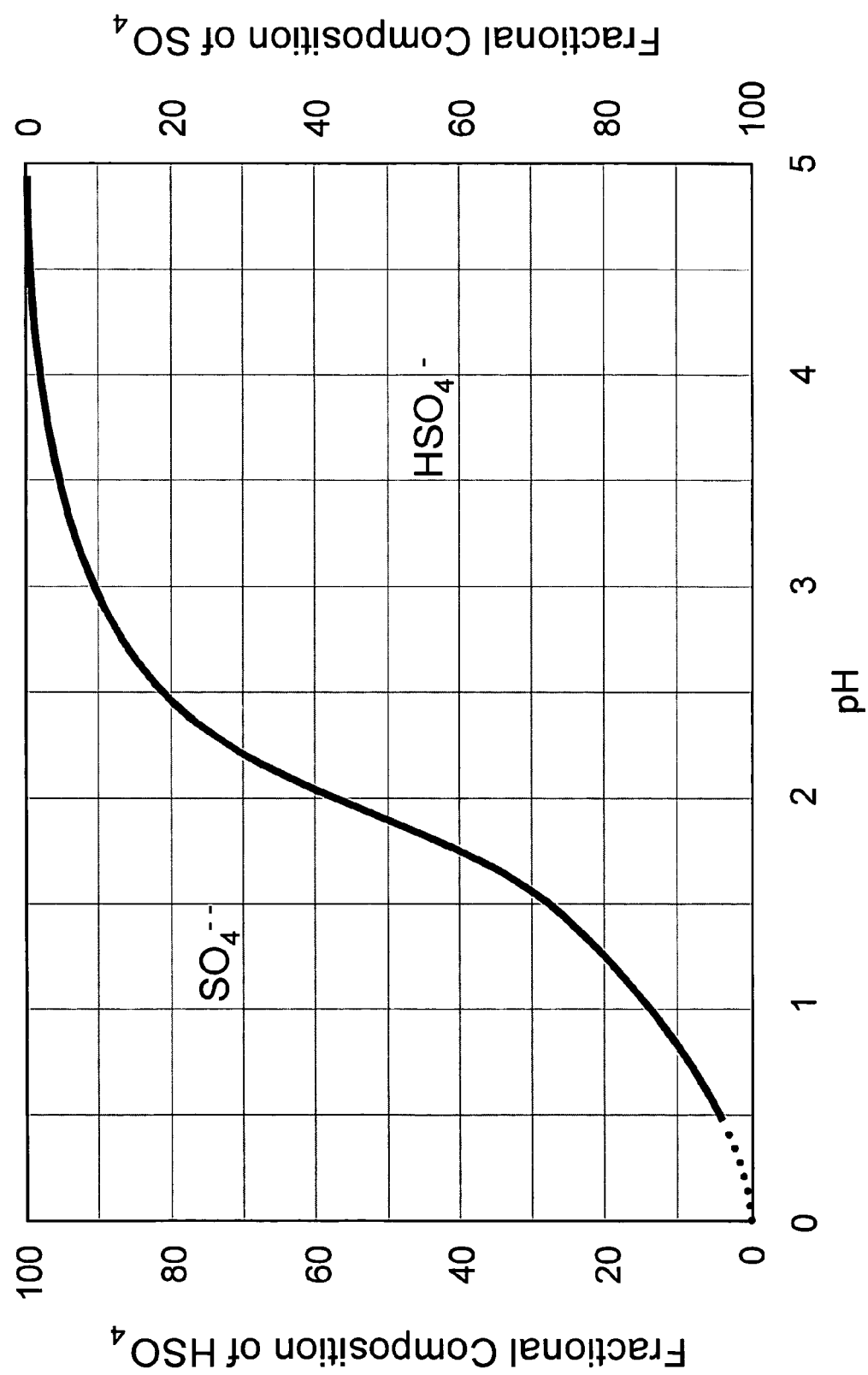
FIG. 3 is a graph showing the equilibrium relative composition of sulfate and bisulfate species as a function of pH in accordance with one or more embodiments of the present invention.

In accordance with one or more embodiments of the present invention, an acid can be introduced into inlet 30 and mixed with wastewater to be treated to promote, maintain, or otherwise alter equilibrium conditions to inhibit the formation of any sulfate ($SO_4^{-2}$) species and/or favor the formation of any bisulfate ($HSO_4$) species. As shown in FIG. 3, the equilibrium relative composition of sulfate and bisulfate species varies as a function of pH. Lower pH conditions can promote the formation of bisulfate species whereas higher pH conditions can promote the formation of sulfate species. Thus, controlling the pH can affect the availability of sulfate species that typically have a tendency to precipitate in the separation systems of the present invention.

Figure 4:
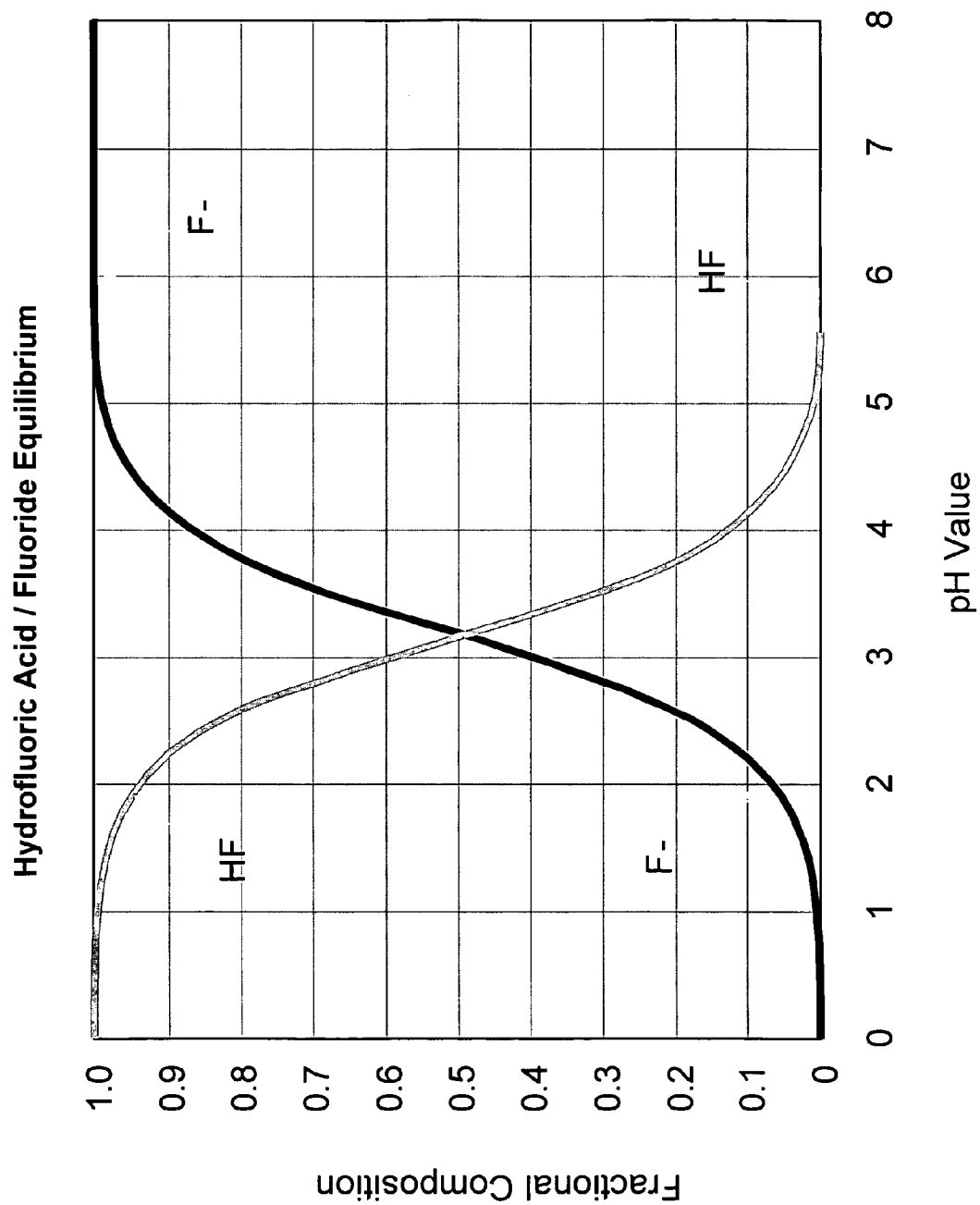
FIG. 4 is a graph showing the equilibrium relative composition of hydrofluoric acid and fluoride species as a function of pH in accordance with one or more embodiments of the present invention.

In other embodiments, acid addition can be utilized to promote, maintain or otherwise alter equilibrium conditions to promote the formation of hydrofluorosilicic acid and/or inhibit precipitation of silica and fluoride species. As shown in FIG. 4, the equilibrium relative composition of hydrofluoric acid and fluoride species varies as a function of pH. Lower pH conditions can promote the formation of hydrofluoric acid species whereas higher pH conditions can promote the formation of fluoride species. Thus, controlling the pH can affect the availability of hydrofluoric acid species, which, in turn, can affect the formation of hydrofluorosilicic species and reduce the availability of precipitating silica or silicate species.

In still other embodiments, acid addition can be utilized to promote, maintain, or otherwise alter equilibrium conditions to promote the solubility phosphate species such as, but not limited to, calcium phosphate. For example, the pH of wastewater to be introduced in inlet 30 of first separation system 18 can be maintained or adjusted to below about 3, typically to below about 2.8, and in some cases to below about 2.5, and in yet other cases to about 2.

Any acid can be used in accordance with the present invention that serves to lower or maintain the pH of a stream to the desired pH range. Suitable examples include hydrochloric acid and sulfuric acid or mixtures thereof. The selection of the particular acid will depend on several factors, including but not limited to, availability and cost as well as other disposal considerations. For example, hydrochloric acid may be preferable over sulfuric acid to avoid any concentration increases of the sulfate species.

Figure 5:
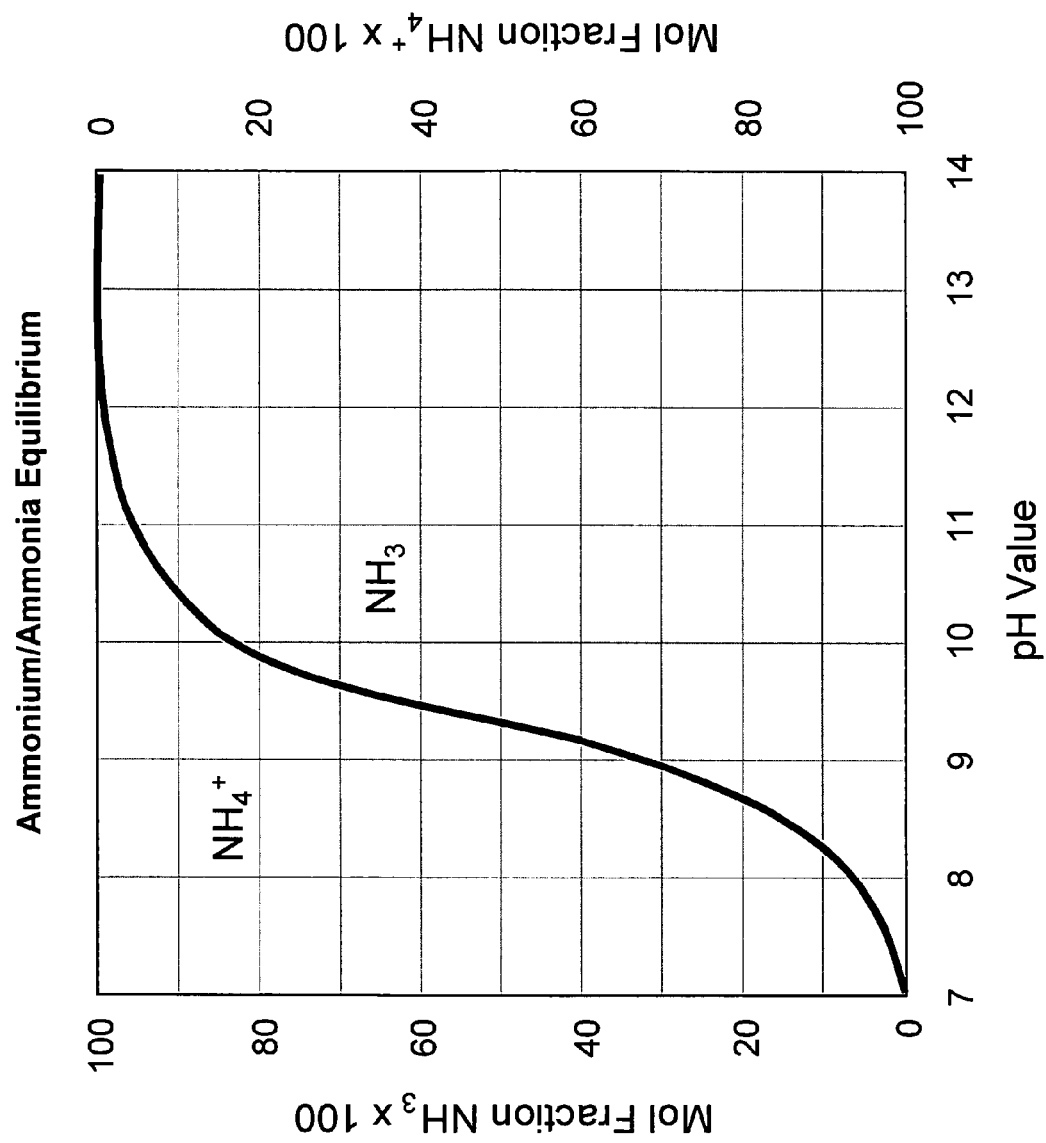
FIG. 5 is a graph showing the equilibrium relative composition of ammonium and ammonia species as a function of pH.
Figure 6:
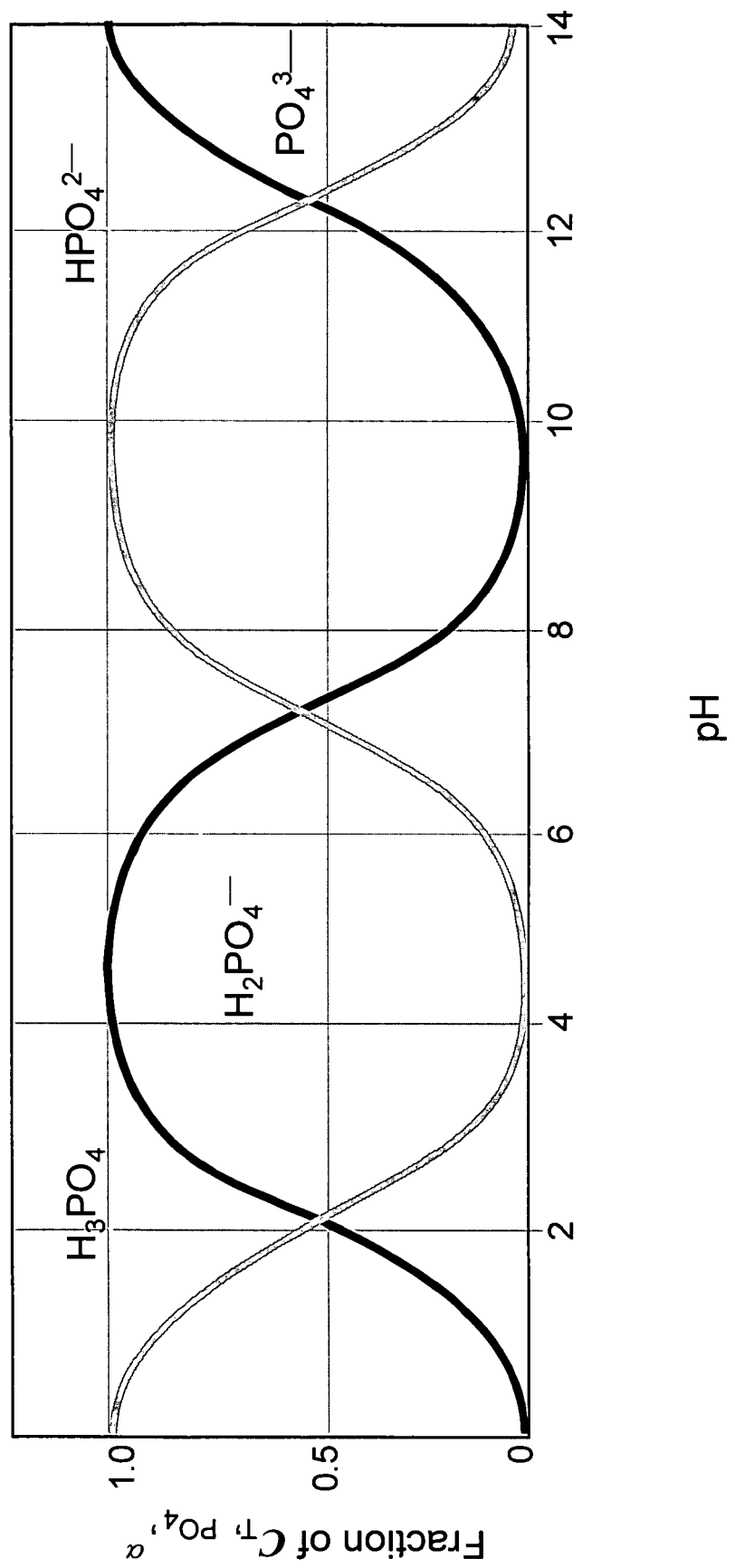
FIG. 6 is a graph showing the equilibrium relative composition of phosphoric acid and phosphate species as a function of pH.

Likewise, an alkali from alkali source 28 can be utilized to adjust one or more chemical properties of wastewater to be treated in second separation system 20. As with acid addition, alkali addition can be advantageously utilized to control and/or maintain the solubility or equilibrium of one or more chemical species. For example, the pH of wastewater treated from first separation system 18 can be adjusted to promote the formation of silicate or fluoride species, or both, to facilitate removal thereof from the wastewater stream in second separation system 20. Similarly, the pH can be adjusted to favor the formation of phosphate and ammonia species to facilitate removal thereof from the wastewater stream in second separation system 20. Thus, in accordance with one or more embodiments of the present invention, the pH of wastewater in an inlet 32 of second separation system 20 can be raised to at least about 6, in some cases to at least about 6.5, and in still other cases to between about 6 and about 7. The pH increase can also facilitate the formation of organic salt and their removal thereof in second separation system 20 to improve the TOC quality of the effluent. As shown in FIG. 5, the equilibrium relative composition of ammonium and ammonia species varies as a function of pH. Lower pH conditions can promote the formation of ammonia species, which can promote removal thereof in the first separation system. In addition, as shown in FIG. 6, the equilibrium relative composition of phosphoric acid and phosphate species varies as a function of pH. pH conditions can be controlled to promote the formation of $H_2PO_4^-$ species, which can promote removal thereof in the second separation system. Any alkali can be used in accordance with the present invention that serves to raise the pH of a stream to the desired pH range. Examples suitable for use as alkali include caustic soda or sodium hydroxide, caustic potash or potassium hydroxide. Preferably, the acid and the alkali comprise species that are suitable for discharge to a body of water. As used herein the terms contaminants and undesirable species refer to species in the wastewater or treated wastewater that have a defined concentration limit. Contaminants include, for example, calcium, magnesium, sodium, potassium, aluminum, barium, ammonium, bicarbonate, sulfate, chloride, phosphate, nitrate, fluoride, silica, iron, and manganese comprising species. As used herein, the term organic matter can include bacteria, microorganisms, algae as well as suspended solids comprising such matter. Also as used herein, the term deactivating refers to rendering organic matter suitable for coagulation and/or flocculation. The function and advantage of these and other embodiments of the present invention will be more fully understood from the example below. The following example is intended to illustrate the benefits of the present invention, but do not exemplify the full scope of the invention.

EXAMPLE

This example shows the operation of a wastewater treatment system in accordance with one or more embodiments of the present invention. In particular, the wastewater treatment system 10, schematically shown in FIG. 1, had pretreatment systems 14 and 16 comprised of a clarifier and a multimedia filter, respectively. The wastewater treatment system further included a first separation system 18 comprised of a first reverse osmosis apparatus and a second separation system 20 comprised of a second reverse osmosis apparatus. The treatment system also included final treatment system 22 comprised of a mixed-bed polisher.

The clarifier comprised of an ACTIFLO® treatment system, available from OTV SA, and utilized NaOCl to deactivate, at least partially, any organic matter. The clarifier also utilized bentonite to promote coagulation of the deactivated organic matter at about 80 to about 250 mg/l, depending on the amount necessary to coagulate the organic matter. A nonionic polymeric agent, P1142 high molecular weight polymer from Betz Dearborn, Downers Grove, Ill., was also utilized in the clarifier to promote flocculation of the coagulated, deactivated organic matter. The flocculating agent was introduced at a concentration of about 1 mg/l. Effluent from the clarifier had a turbidity of less than about 3 NTU. Sludge and other semisolid waste from the clarifier was returned to the accumulation pond or otherwise disposed.

The multimedia filter utilized media comprised of anthracite, sand and garnet to reduce the turbidity of the wastewater to less than about 2NTU and to reduce the SDI to less than about 4.

The mixed-bed polisher utilized a mixed-bed of DOWEX™ MARATHON™ A and DOWEX™ MARATHON™ C ion exchange resins, each available from The DOW™ Chemical Corporation, Midland, Mich. The mixed-bed polisher served to further control the concentration of $NH_3$ to below about 1 mg/l, to reduce the concentration of $PO_4$ species to below about 0.5 mg/l.

The first reverse osmosis apparatus utilized FILMTEC™ BW30-365 membranes from FilmTec Corporation, a subsidiary of The Dow™ Chemical Corporation, Midland, Mich. It was operated at an average flux rate of about 10 GFD at about 250-300 psig operating pressure. The second reverse osmosis apparatus also utilized FILMTEC™ BW30-365 membranes. It was operated at an average flux rate of about 18 GFD. If necessary, acid (hydrochloric acid) was added from an acid source to the influent wastewater stream before treatment in the first reverse osmosis apparatus to control the pH to below about 3. Alkali, sodium hydroxide, was added to the wastewater stream after the first reverse osmosis apparatus and before introduction into the second reverse osmosis apparatus to raise the pH to between about 6 and about 7. Influent wastewater was retrieved from an accumulation pond of a phosphate manufacturing facility. It typically had contaminant concentrations as listed in Table 2. The pH of the wastewater influent into the first reverse osmosis apparatus was adjusted or maintained at between about 2 to 2.8 to maintain or promote the complexing of silica and fluoride to form hydrofluorosilicic acid species thereby reducing the scaling potential associated with silica and calcium fluoride. The pH conditions also served to shift equilibrium to favor the formation of phosphoric acid, calcium bisulfate and ammonium species and consequently reduced the scaling potential associated with calcium phosphate and calcium sulfate while promoting removal of ammonia. Table 2 lists the properties, including the contaminant concentrations, of the permeate stream from the first reverse osmosis apparatus (First Pass Permeate Composition). Table 2 also lists the properties and contaminant concentrations of the permeate stream from the second reverse osmosis apparatus (Second Pass Permeate Composition). The data show that the systems and techniques of the present invention can be used to treat wastewater and produce an effluent suitable for discharge that meets or exceeds EPA water discharge requirements. This example also illustrated the use of a wastewater treatment system that had lower costs relative to traditional systems while avoiding lime sludge and other pretreatment chemical disposal.

TABLE 2

Wastewater Composition (in mg/l unless indicated).

| Constituent | Influent Composition | First Pass Permeate Composition | Second Pass Permeate Composition |
|---|---|---|---|
| Calcium | 551 | 0.25 | 0.1 |
| Magnesium | 229 | 0.074 | 0.025 |
| Sodium | 1,290 | 50.7 | 1.4 |
| Potassium | 196 | 0.86 | 0.021 |
| Aluminum | 8.4 | 0.05 | 0.05 |
| Barium | 0.02 | 0.001 | 0.001 |
| Ammonium | 600 | 5.2 | 0.27 |
| Bicarbonates | 0.78 | — | 2.4 |
| Sulfates | 5,200 | 5.5 | 0.2 |
| Chlorides | 100 | 14 | 0.26 |
| Phosphates | 1,600 | 1.1 | 0.004 |
| Nitrates | 0.26 | 0.16 | 0.014 |
| Fluorides | 150 | 35 | 0.54 |
| Silica | 200 | 0.61 | 0.3 |
| Iron | 5.6 | 0.02 | 0.025 |
| Manganese | 2.9 | 0.006 | 0.005 |
| TDS | 11,500 | 111 | 15 |
| TSS | 24 | 4 | — |
| BOD | 17 | 0.74 | 0.2 |
| TOC | 66 | 1.0 | 0.55 |
| TKN | 650 | 5.9 | 1 |
| pH | 2.8 | 2.9 | 6.3 |
| Turbidity (NTU) | 14 | 0.25 | 0.05 |
| Color (PCU) | 110 | 5 | 5 |

While several embodiments of the invention have been described and illustrated herein, those of ordinary skill in the art will readily envision a variety of other systems and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are exemplary and that actual parameters, dimensions, materials, and configurations depend upon specific applications for which the teachings of the present invention are used. Thus, the size and capacity of each of the unit operations would vary depending on several considerations specific to an installation. Further, the particular materials of construction of the vessels, pumps, and other components of the system of the present invention would be dependent also on particular, specific installation considerations but the selection, construction, and design of such components and systems would be within the scope of those skilled in the art. For example, those skilled in the art would recognize that stainless steel should be used as materials of construction of unit operations for service or applications where carbon steel would be unsuitable. Those skilled in the art will recognize, or be able to ascertain, using no more than routine experimentation, equivalents to the specific embodiments of the invention described herein. It is, therefore, understood that the embodiments disclosed herein are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention. As used herein, all transitional phrases such as "comprising," "including," "having," "containing," "involving," and the like are open-ended, i.e. to mean including but not limited and only the transitional phrases "consisting of and "consisting essentially of shall be closed or semi-closed transitional phrases, respectively, as set forth in § 2111.03 of the United States Patent Office Manual of Patent Examining Procedures.

We claim:

1. A method of removing contaminants from an influent wastewater stream, the method comprising:
   a. initially chemically adjusting a pH of the influent wastewater stream to less than about 3.5 or maintaining the pH of the influent stream at less than about 3.5;
   b. after initially adjusting or maintaining the pH of the influent wastewater stream, directing the wastewater to a first reverse osmosis system and removing contaminants from the wastewater;
   c. directing the wastewater from the first reverse osmosis system to a second reverse osmosis system and removing contaminants from the wastewater;
   d. adjusting the pH upwardly after the wastewater has been subjected to treatment in the first reverse osmosis system and prior to treatment in the second reverse osmosis system; and
   e. directing the influent wastewater stream through a ballasted flocculation system disposed upstream from the first reverse osmosis system.

2. The method of claim 1 including adjusting the pH of the wastewater upwardly to at least about 6 or higher before the wastewater is directed through the second reverse osmosis system.

3. The method of claim 2 including maintaining the wastewater effluent from the first reverse osmosis system at about 6 or higher prior to the wastewater being directed through the second reverse osmosis system.

4. The method of claim 1 wherein the wastewater to be treated includes fluorides, silica, phosphates, calcium, and sulfates, and wherein after initially adjusting the pH of the influent wastewater stream to less than about 3.0, maintaining the pH of the influent wastewater to less than about 3.0 prior to entry into the first reverse osmosis system so as to condition the influent wastewater stream to favor the formation of complexing species of silica and fluoride and which further favor the formation of bisulfates, thereby reducing the scaling potential in the first reverse osmosis system due to silica, calcium fluoride, calcium sulfate, calcium phosphate or metals.

5. The method of claim 4 wherein adjusting the pH of the wastewater effluent from the first reverse osmosis system upwardly forms conditions in the wastewater that favor the formation of fluoride and silicate ions or converts any weakly ionized acids into salt form; and wherein at least 90% of the fluorides, silica, phosphates, calcium and sulfates are removed by the first and second osmosis systems.

6. The method of claim 5 wherein the wastewater being treated also includes ammonia, phosphates or metals and wherein initially adjusting the pH of the influent wastewater stream comprises controlling the pH of the influent wastewater stream to condition the wastewater to favor the formation of phosphoric acid and ammonium ions that reduce scaling potential in the first reverse osmosis system due to calcium phosphate and improves ammonia removal in the first reverse osmosis system; and wherein adjusting the pH upwardly of the wastewater effluent from the first reverse osmosis system conditions the wastewater to favor the formation of phosphate ions which contribute to the removal of phosphates in the second reverse osmosis system and further conditions the wastewater to generally increase the solubility of organics and thereby contributes to the removal of the organics in the second reverse osmosis system.

7. The method of claim 1 including directing the wastewater effluent from the ballasted flocculation system through a multimedia filter prior to the wastewater being directed to the first reverse osmosis system.

8. The method of claim 1 wherein the wastewater includes algae and wherein the method entails mixing chlorine or a chlorine byproduct with the wastewater to kill the algae, and mixing bentonite with the wastewater to absorb or destabilize the algae.

9. The method of claim 1 wherein adjusting or maintaining the pH of the influent wastewater stream to less than about 3.5 includes selectively adding an acid to the influent wastewater stream; and wherein adjusting the pH upwardly of the wastewater effluent from the first reverse osmosis system includes selectively adding an alkali to the wastewater.

10. A method of removing fluorides from influent wastewater comprising:
    a. directing the wastewater to a first reverse osmosis system and removing fluorides from the wastewater;
    b. prior to the wastewater entering the first reverse osmosis system, chemically adjusting or maintaining the pH of the wastewater to less than about 3.5;
    c. directing the wastewater from the first reverse osmosis system to a second reverse osmosis system and removing fluorides from the wastewater;
    d. adjusting the pH of the wastewater upwardly after the wastewater has been subjected to treatment in the first reverse osmosis system and prior to treatment in the second reverse osmosis system;
    e. removing at least 90% of the fluorides from the wastewater with the first and second reverse osmosis systems; and
    f. directing the wastewater through a sand ballasted flocculation system prior to the wastewater being directed to the first reverse osmosis system.

11. The method of claim 10 wherein the influent wastewater also includes calcium, sulfates, phosphates and silica, and wherein at least 90% of the calcium, sulfates, phosphates and silica is removed by the first and second reverse osmosis systems.

12. The method of claim 10 including filtering the wastewater prior to the wastewater being directed to the first reverse osmosis system.

13. The method of claim 10 wherein the sand ballasted flocculation system or other type of clarification system produces a clarified effluent and the method includes filtering the clarified effluent from the sand ballasted flocculation system or other type of clarification system and directing the filtered effluent from the ballasted flocculation system to the first reverse osmosis system.

14. The method of claim 10 wherein the influent wastewater includes an initial pH and wherein the method includes maintaining the pH of the wastewater at or below its initial pH at least until the wastewater has been treated by the first reverse osmosis system.

15. The method of claim 10 including adjusting the pH of the wastewater upwardly to at least about 6 or higher before the wastewater is directed through the second reverse osmosis system.

16. The method of claim 10 wherein the wastewater includes silica, phosphates, calcium and sulfates and wherein the method includes conditioning the wastewater prior to entry into the first reverse osmosis system to favor the formation of complexing species of silica and fluoride and which further favor the formation of bisulfates, thereby reducing the scaling potential in the first reverse osmosis system due to silica, calcium fluoride, calcium carbonate, calcium sulfate, calcium phosphates and metal scales.

17. The method of claim 16 wherein adjusting the pH of the wastewater effluent from the first reverse osmosis system upwardly conditions the wastewater to favor the formation of fluoride and silicate ions or converts any weakly ionized acids into salt form.

18. The method of claim 10 wherein the wastewater includes calcium, ammonia and phosphates or metals, and wherein the method includes conditioning the wastewater prior to entry into the first reverse osmosis system to favor the formation of phosphoric acid and ammonium ions and that reduce scaling potential in the first reverse osmosis system due to calcium phosphate and improves ammonia removal in the first reverse osmosis system; and conditioning the wastewater effluent from the first reverse osmosis system to favor the formation of phosphate ions which contribute to the removal of phosphates in the second reverse osmosis system and further conditions the wastewater to generally increase the solubility of organics and thereby contributes to the removal of the organics in the second reverse osmosis system.

19. The method of claim 10 wherein the wastewater includes algae and the method includes mixing chlorine or chlorine byproduct with the wastewater to kill the algae, and mixing benonite with the wastewater to absorb or destabilize the algae.

20. The method of claim 10 wherein the wastewater includes silica and the method includes forming hydroflorsilic acid in the wastewater prior to the wastewater being directed through the first reverse osmosis system, and removing fluorides and silicate with the first reverse osmosis system.

21. The method of claim 10 wherein the wastewater includes calcium, phosphates, and sulfates, and the method includes conditioning the wastewater to reduce the potential for the formation of calcium fluoride, calcium phosphate or calcium carbonate and calcium sulfate.

22. The method of claim 20 wherein adjusting the pH of the wastewater effluent from the first reverse osmosis system upwardly causes fluorides and silica in the wastewater to assume the form of fluoride and silicate ions which are removed from the wastewater in the second reverse osmosis system.

23. The method of claim 20 wherein the wastewater also includes sulfates, phosphates and ammonia, and wherein prior to entering the first reverse osmosis system the wastewater is conditioned to favor the formation of bisulfates, phosphoric acid and ammonium ions, and wherein adjusting the pH of the wastewater effluent from the first reverse osmosis system upwardly conditions the wastewater to favor the formation of phosphate ions and generally increases the ionization of some organics which contribute to the removal of phosphates, organics, and ammonia from the wastewater.

24. The method of claim 10 wherein the influent wastewater has a pH of less than 3.5.

25. The method of claim 24 wherein the pH of the wastewater is maintained at 3.5 or below until the wastewater exits the first reverse osmosis system.

26. The method of claim 25 wherein a first upward adjustment of the pH of the wastewater occurs after the wastewater exits the first reverse osmosis system.

27. The method of claim 25 wherein the pH of the wastewater effluent from the first reverse osmosis system is adjusted upwardly to about 6 or more.

28. The method of claim 10 wherein the wastewater originates from an influent wastewater stream having a pH of 3.5 or less, and wherein the wastewater is subject to one or more pretreatments upstream of the first reverse osmosis system, and wherein the method includes maintaining the pH of the wastewater at 3.5 or below as the wastewater passes through the one or more pretreatments and prior to the wastewater entering the first reverse osmosis system.

29. The method of claim 28 wherein a first upward adjustment of the pH of the wastewater occurs after the wastewater has exited the first reverse osmosis system.

30. A wastewater treatment system for removing contaminants such as fluorides, silica, phosphates, sulfates, ammonia, and metals comprising:
  a. a sand ballasted flocculation system having one or more mixing tanks for mixing a ballast with the wastewater to be treated and a settling tank disposed downstream of the one or more mixing tanks which produces a clarified effluent and sludge;
  b. a first reverse osmosis system disposed downstream of the sand ballasted flocculation system for treating the clarified effluent produced by the ballasted flocculation system;
  c. a second reverse osmosis system disposed downstream from the first reverse osmosis system for treating the effluent from the first reverse osmosis;
  d. an acid injection inlet disposed upstream from the first reverse osmosis system and adapted to be operatively connected to an acid source for selectively injecting an acid into the wastewater prior to the wastewater reaching the first reverse osmosis system; and
  e. an alkali injection inlet disposed between the first and second reverse osmosis systems and adapted to be operatively connected to an alkali source for selectively injecting an alkali into the wastewater effluent from the first reverse osmosis system for adjusting the pH of the wastewater effluent from the first reverse osmosis system.

31. The wastewater treatment system of claim 29 including a filter disposed between the sand ballasted flocculation system and the first reverse osmosis system for filtering the clarified effluent from the sand ballasted flocculation system prior to the clarified effluent entering the first reverse osmosis system.

32. The wastewater treatment system of claim 29 further comprising a mixed bed ion exchange polisher disposed downstream from the second reverse osmosis system.

33. The wastewater treatment system of claim 30 wherein the filter is a multimedia filter.

34. A method of removing contaminants from an influent wastewater stream, the method comprising:
  a. initially chemically adjusting a pH of the influent wastewater stream to less than about 3.5 or maintaining the pH of the influent stream at less than about 3.5;
  b. after initially adjusting or maintaining the pH of the influent wastewater stream, directing the wastewater to a first reverse osmosis system and removing contaminants from the wastewater;

c. directing the wastewater from the first reverse osmosis system to a second reverse osmosis system and removing contaminants from the wastewater;
d. adjusting the pH upwardly after the wastewater has been subjected to treatment in the first reverse osmosis system and prior to treatment in the second reverse osmosis system; and
e. wherein the wastewater includes algae and wherein the method entails mixing chlorine or a chlorine product with the wastewater to kill the algae, and mixing bentonite with the wastewater to absorb or destabilize the algae.

* * * * *